United States Patent
Song

(10) Patent No.: US 11,629,823 B2
(45) Date of Patent: Apr. 18, 2023

(54) WIRELESS LIGHTING CONTROL SYSTEM

(71) Applicant: FANLIGHT CO., LTD., Uiwang-si (KR)

(72) Inventor: Ho Lim Song, Seoul (KR)

(73) Assignee: FANLIGHT CO., LTD., Uiwang-si (KR)

( * ) Notice: Subject to any disclaimer, the term of this patent is extended or adjusted under 35 U.S.C. 154(b) by 0 days.

(21) Appl. No.: 17/551,090

(22) Filed: Dec. 14, 2021

(65) Prior Publication Data

US 2022/0107059 A1 Apr. 7, 2022

Related U.S. Application Data

(63) Continuation of application No. 17/092,413, filed on Nov. 9, 2020, now Pat. No. 11,231,146, which is a (Continued)

(30) Foreign Application Priority Data

Jun. 18, 2015 (KR) .................. 10-2015-0086769

(51) Int. Cl.
*H05B 47/00* (2020.01)
*F21K 2/00* (2006.01)
(Continued)

(52) U.S. Cl.
CPC .............. *F21K 2/00* (2013.01); *F21S 10/02* (2013.01); *H05B 47/155* (2020.01); *H05B 47/19* (2020.01); *H05B 47/10* (2020.01); *Y02B 20/40* (2013.01)

(58) Field of Classification Search
CPC . F21K 2/00; F21S 10/02; H05B 47/10; H05B 47/19; H05B 47/155; Y02B 20/40
See application file for complete search history.

(56) References Cited

U.S. PATENT DOCUMENTS 7,697,925 B1 4/2010 Wilson et al.
9,286,592 B2 * 3/2016 Denker .................. G07B 15/00
(Continued)

FOREIGN PATENT DOCUMENTS

CN 102415077 A 4/2012
CN 104093244 A 10/2014
(Continued)

OTHER PUBLICATIONS

International Search Report issued in PCT/KR2016/006491; dated Sep. 21, 2016.
(Continued)

*Primary Examiner* — Kurtis R Bahr
(74) *Attorney, Agent, or Firm* — Studebaker & Brackett PC

(57) ABSTRACT

A wireless lighting control system is provided to create a lighting pattern by remotely controlling a plurality of lighting devices according to groups, thereby improving a lighting effect. The wireless lighting control system includes a first lighting device electrically connected with a first smart device to act as a master, and a plurality of second lighting devices electrically connected with a plurality of second smart devices to act as slaves, respectively. If a group for lighting control and control pattern information according to groups are selected from the first smart device, the first lighting device transmits the control pattern information according to the groups to the second lighting devices through a wireless communication scheme. At least one of lighting units of the second lighting devices and display units of the second smart devices is controlled based on the control pattern information according to the groups.

8 Claims, 7 Drawing Sheets

Related U.S. Application Data continuation of application No. 15/827,407, filed on Nov. 30, 2017, now Pat. No. 10,880,975, which is a continuation of application No. PCT/KR2016/006491, filed on Jun. 17, 2016.

(51) Int. Cl.
*H05B 47/19* (2020.01)
*H05B 47/155* (2020.01)
*F21S 10/02* (2006.01)
*H05B 47/10* (2020.01)

(56) References Cited

U.S. PATENT DOCUMENTS

| | | | |
|---|---|---|---|
| 9,763,311 B2 | 9/2017 | Huang et al. | |
| 2007/0291483 A1* | 12/2007 | Lys | A01M 1/04 362/227 |
| 2011/0115413 A1 | 5/2011 | Erickson et al. | |
| 2011/0193779 A1 | 8/2011 | Williams | |
| 2012/0034934 A1 | 2/2012 | Loveland et al. | |
| 2012/0105466 A1 | 5/2012 | Leslie | |
| 2013/0240628 A1 | 9/2013 | van der Merwe et al. | |
| 2014/0132390 A1 | 5/2014 | Loveland et al. | |
| 2014/0273811 A1 | 9/2014 | Czapla et al. | |
| 2014/0361968 A1* | 12/2014 | Kondo | H04N 5/64 345/102 |
| 2015/0012308 A1 | 1/2015 | Snyder | |
| 2015/0163886 A1 | 6/2015 | Park | |
| 2015/0264091 A1 | 9/2015 | Lin et al. | |
| 2015/0382144 A1 | 12/2015 | Lopez | |
| 2016/0165659 A1 | 6/2016 | Deng et al. | |
| 2016/0227632 A1 | 8/2016 | Zhang et al. | |
| 2016/0323977 A1 | 11/2016 | Sun et al. | |
| 2016/0338179 A1 | 11/2016 | Aliakseyeu et al. | |
| 2017/0085688 A1 | 3/2017 | Zhou et al. | |
| 2018/0049293 A1 | 2/2018 | Krans et al. | |

FOREIGN PATENT DOCUMENTS

| | | |
|---|---|---|
| JP | 2011-186539 A | 9/2011 |
| JP | 2011-249053 A | 12/2011 |
| JP | 2013-004323 A | 1/2013 |
| JP | 2013-191380 A | 9/2013 |
| JP | 2015-011981 A | 1/2015 |
| KR | 10-2005-0112540 A | 12/2005 |
| KR | 10-2011-0106702 A | 9/2011 |
| KR | 10-2012-0006254 A | 1/2012 |
| KR | 10-2012-0110715 A | 10/2012 |
| KR | 10-2013-0081109 A | 7/2013 |
| KR | 101414083 B1 | 7/2014 |
| KR | 10-2014-0095381 A | 8/2014 |
| KR | 10-2014-0112805 A | 9/2014 |

OTHER PUBLICATIONS

An Office Action; "Notice of Allowance," issued by the Korean Intellectual Property Office dated May 19, 2017, which corresponds to Korean Patent Application No. 10-2015-0086769.

An Office Action; "Notice of Reasons for Refusal" issued by the Japanese Patent Office dated Jan. 8, 2019, which corresponds to Japanese Patent Application No. 2017-563116 and is related to U.S. Appl. No. 15/827,407; with English translation.

A Notification of First Office Action issued by the Chinese Patent Office dated Dec. 21, 2018, which corresponds to Chinese U.S. Appl. No. 15/827,407.8 and is related to U.S. Appl. No. 15/827,407; with English translation.

An Office Action issued by the Korean Patent Office on Apr. 24, 2018, which corresponds to Korean Patent Application No. 10-2017-0063040 and is related to U.S. Appl. No. 15/827,407; with English translation.

The extended European search report issued by the European Patent Office dated Jan. 23, 2019, which corresponds to European Patent Application No. 16811990.7-1204 and is related to U.S. Appl. No. 15/827,407.

An Office Action; "Notice of Reasons for Refusal," issued by the Japanese Patent Office dated Jul. 9, 2019, which corresponds to Japanese Patent Application No. 2017-563116 and is related to U.S. Appl. No. 15/827,407; with English language translation.

An Office Action issued by the Korean Patent Office dated Aug. 6, 2019, which corresponds to Korean Patent Application No. 10-2019-0033366 and is related to U.S. Appl. No. 15/827,407; with English language translation.

An Office Action mailed by China National Intellectual Property Administration dated Dec. 3, 2021, which corresponds to Chinese Patent Application No. 202010407917.9 and is related to U.S. Appl. No. 17/551,090; with English translation.

An Office Action; "Notice of Reasons for Refusal", mailed by the Japanese Patent Office dated Sep. 28, 2021, which corresponds to Japanese Patent Application No. 2020-211901 and is related to U.S. Appl. No. 17/551,090; with English translation.

The extended European search report issued by the European Patent Office dated Jan. 17, 2022, which corresponds to European Patent Application No. 21200502.9-1202 and is related to U.S. Appl. No. 17/551,090.

\* cited by examiner

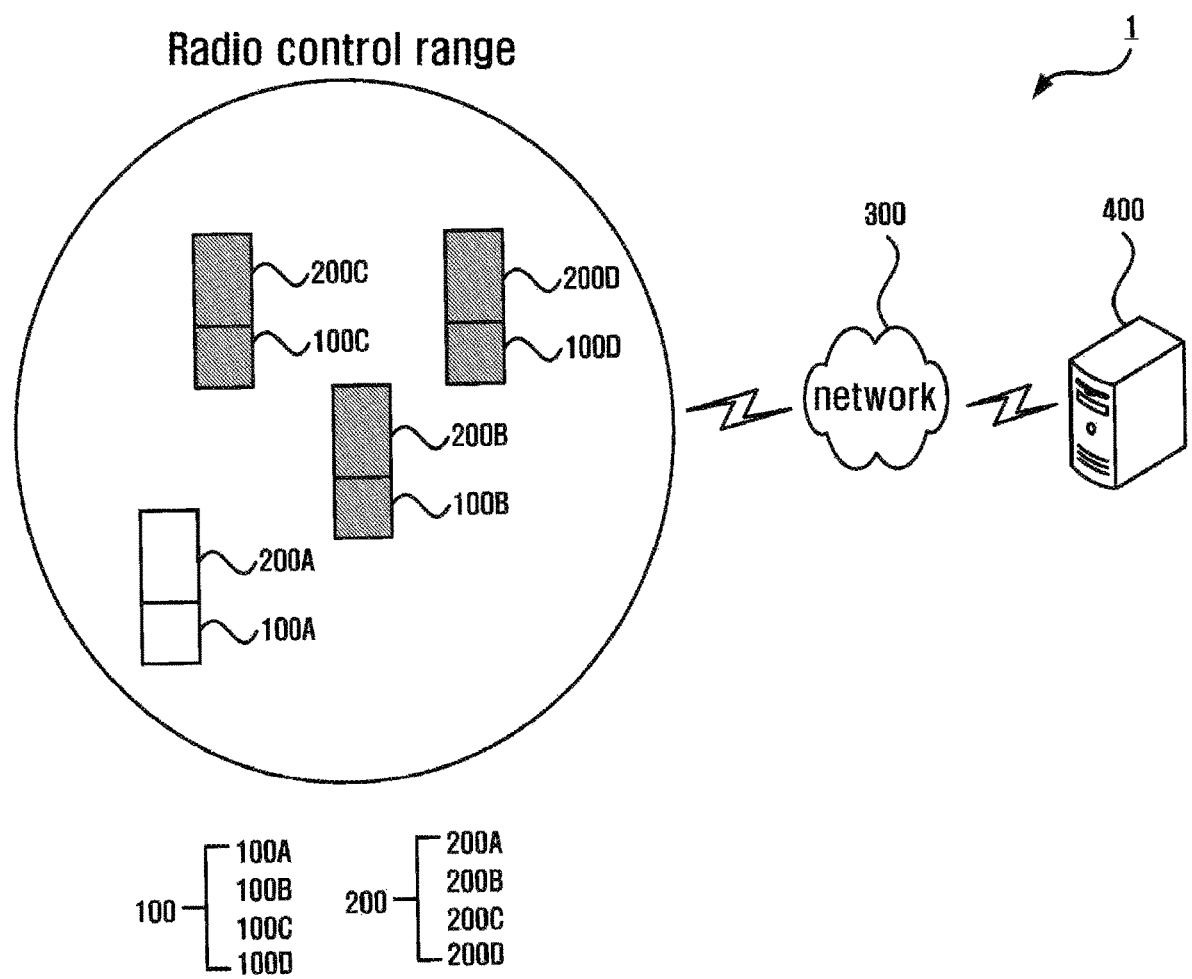

[FIG. 2]
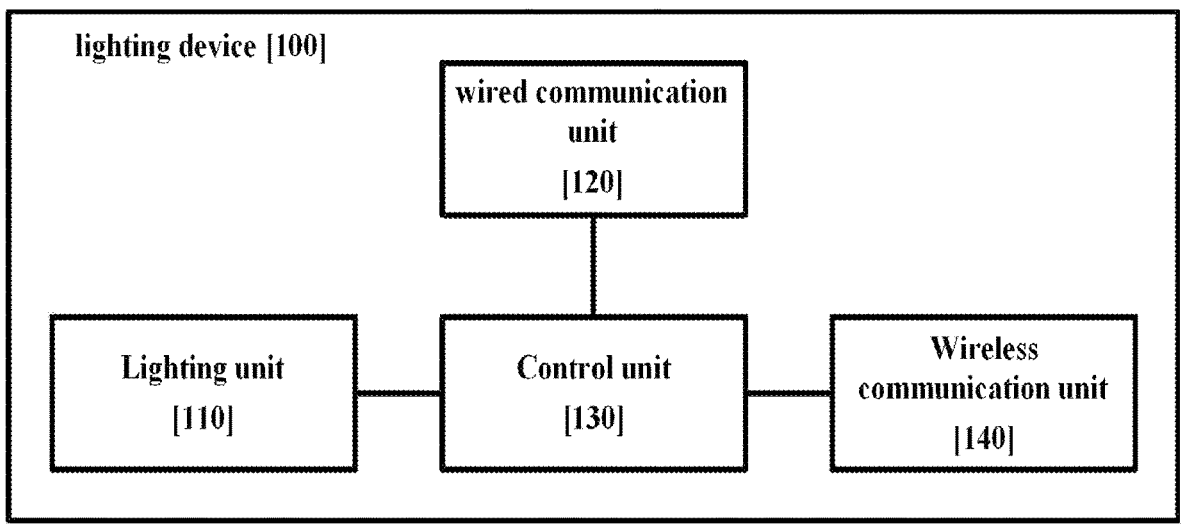

[FIG. 3]
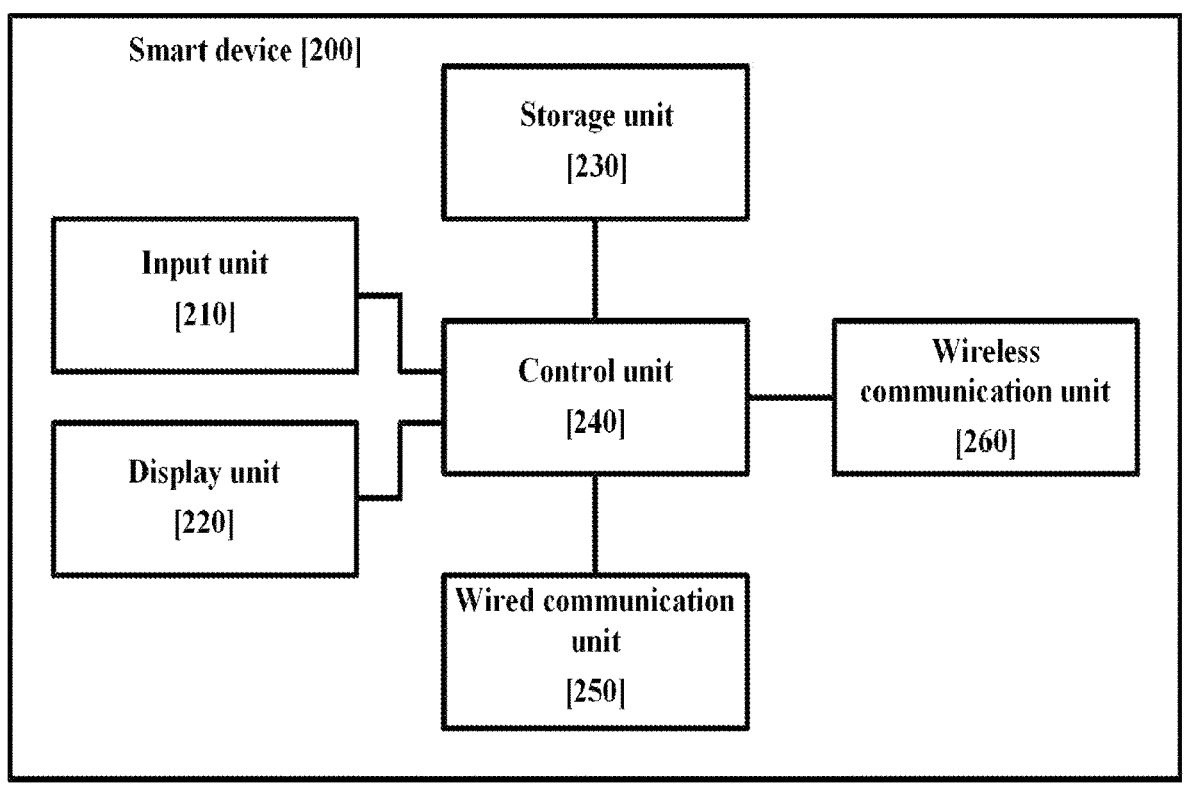

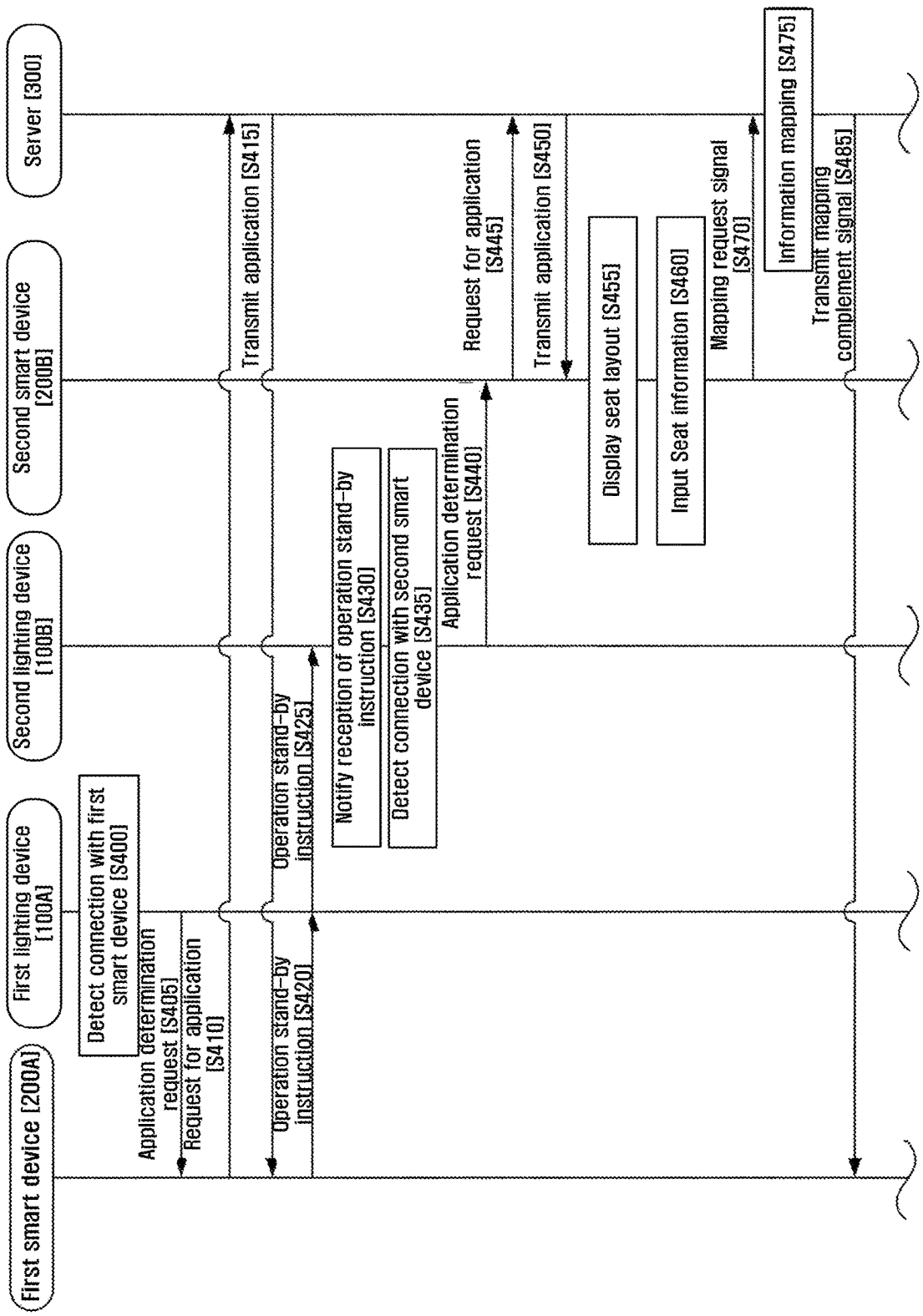
[FIG. 4]

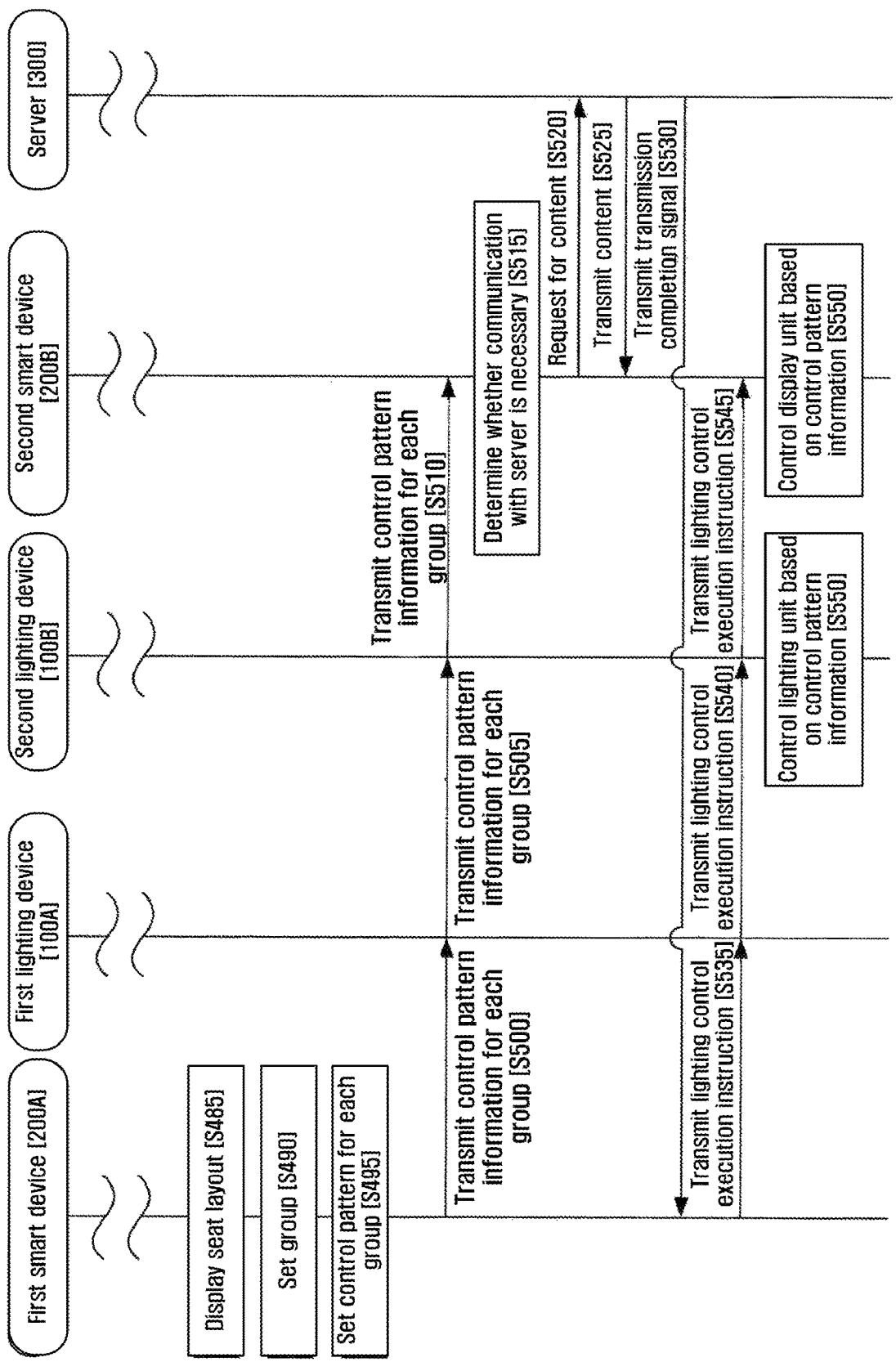
[FIG. 5]

[FIG. 6]
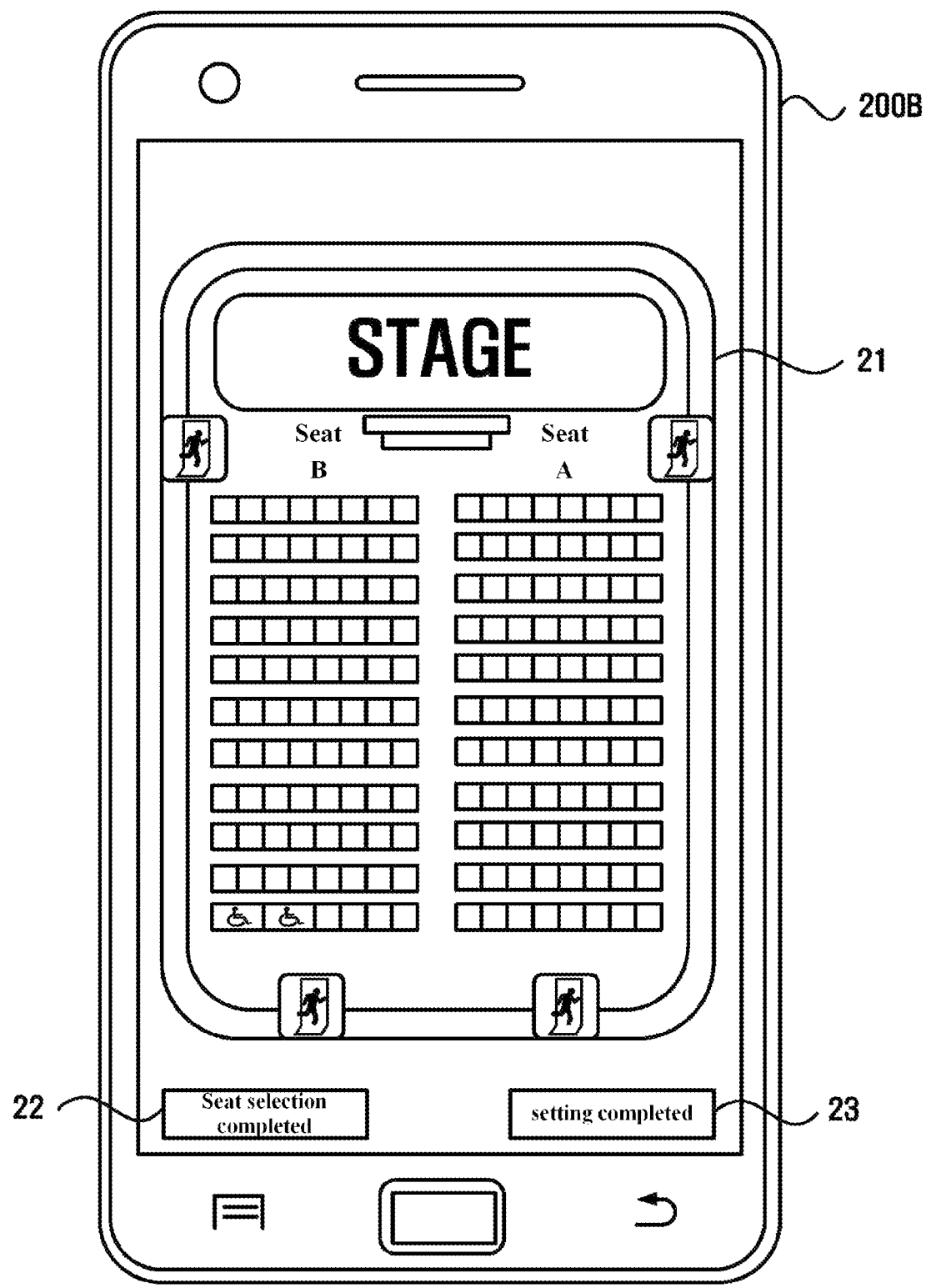

[FIG. 7]
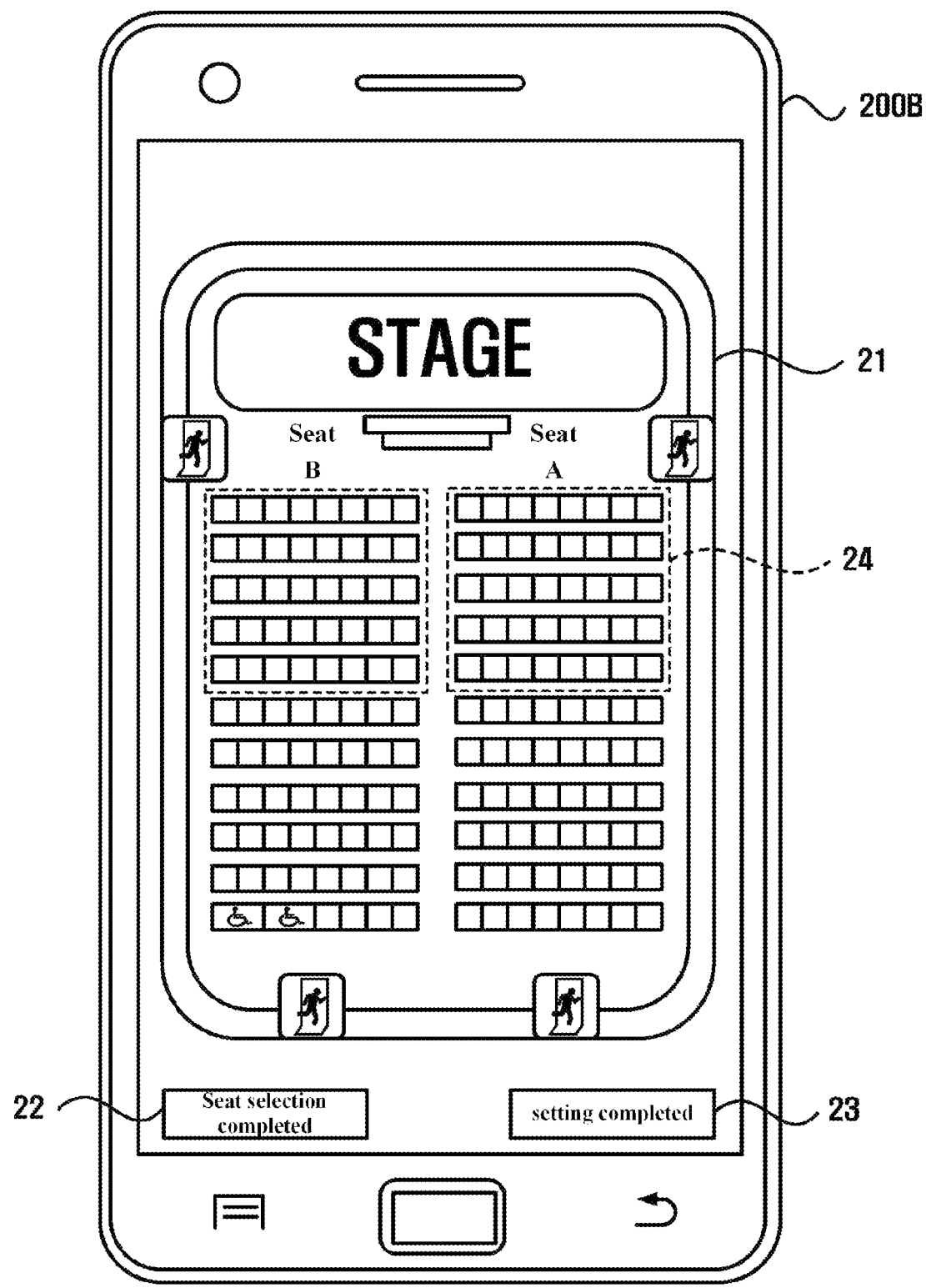

WIRELESS LIGHTING CONTROL SYSTEM

CROSS-REFERENCE TO RELATED APPLICATIONS

The present application is a continuation of U.S. patent application Ser. No. 17/092,413, filed on Nov. 9, 2020, which is is a continuation of U.S. patent application Ser. No. 15/827,407, filed on Nov. 30, 2017, which is a continuation of International Patent Application No. PCT/KR2016/006491, filed on Jun. 17, 2016, which is based upon and claims the benefit of priority to Korean Patent Application No. 10-2015-0086769, filed on Jun. 18, 2015. The disclosures of the above-listed applications are hereby incorporated by reference herein in their entirety.

BACKGROUND

Embodiments of the inventive concept described herein relate to wireless lighting control systems, and more particularly, relate to wireless lighting control systems capable of creating lighting patterns by remotely controlling a plurality of lighting devices, thereby increasing a lighting effect.

In general, lighting devices may achieve the purpose of lighting by reflecting, refracting, and transmitting light emitted from light sources. The lighting devices may be classified, according to light distribution, into an indirect lighting device, a semi-indirect lighting device, a general diffuse lighting device, a semi-direct lighting device, and a direct lighting device.

As technologies are developed, the lighting devices have been employed for various uses. For example, the lighting devices may be used to express Media Facade. The Media Facade refers to implementing a media function by m lighting devices on an outer wall of a building.

For another example, the lighting devices may be used as small cheering tools in sports matches, concerts, or the like which are held under an environment having specific illuminance or less. However, since a plurality of lighting devices are individually controlled under such an environment, systematical lighting patterns or lighting shapes may not be created. In addition, if only a light source provided in the lighting device is used, a desired cheering effect may not be produced.

SUMMARY

Embodiments of the inventive concept provide wireless lighting control systems capable of creating lighting patterns by remotely controlling a plurality of lighting devices according to groups, thereby improving a lighting effect.

According to an aspect of an embodiment, a wireless lighting control system includes a first lighting device electrically connected with a first smart device to act as a master, and a plurality of second lighting devices electrically connected with a plurality of second smart devices to act as slaves, respectively. If a group for lighting control and control pattern information according to groups are set from the first smart device, the first lighting device transmits the control pattern information according to the groups to the second lighting devices through a wireless communication scheme. At least one of lighting units of the second lighting devices and display units of the second smart devices is controlled based on the control pattern information according to the groups.

The control pattern information includes at least one of control pattern information for the lighting unit of the second lighting device and control pattern information for the display unit of the second smart device.

The control pattern information for the lighting unit of the second lighting device includes at least one of a light color, a light brightness, a light-on time, a light-off time, and a light blinking rate. The control pattern information for the display unit of the second smart device includes at least one of a screen color, a screen brightness, a screen display start time, a screen display termination time, a time interval for screen blinking, and identification information of content to be displayed on a screen.

The wireless lighting control system further includes a server to map identification information of the second lighting devices, identification information of the second smart devices, and information on seats, in which users of the second smart devices are positioned, to a seat layout, based on mapping request signals received from the second smart devices and to transmit a mapping completion signal to the first smart device.

The second smart devices directly receive the information on the seats from the users of the second smart devices, acquire the information on the seats from bar codes printed on tickets, or acquire the information on the seats from near-field communication tags attached to the seats.

If content identification information to be displayed on the display units is contained in the control pattern information, the second smart devices transmit content request signals to the server and receive content from the server.

The first lighting device transmits, to the first smart device, a determination request signal for determining whether a lighting control application is installed, if detecting the electrical connection with the first smart device, and the first smart device transmits an application request signal to a server and receives the lighting control application from the server.

As described above, a plurality of lighting devices may be controlled according to groups and various lighting patterns may be created in sports matches or concerts, thereby improving a cheering effect due to various lighting patterns.

Since the lighting patterns may be created by utilizing the resources of the lighting devices and the resources of the smart devices interworking with the lighting devices, the lighting effect may be increased.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 1 is a view illustrating the configuration of a wireless lighting control system, according to an embodiment;

FIG. 2 is a block diagram illustrating the configuration of a lighting device illustrated in FIG. 1;

FIG. 3 is a block diagram illustrating the configuration of a smart device illustrated in FIG. 1;

FIGS. 4 and 5 are flowcharts illustrating the operation of the wireless lighting control system, according to an embodiment;

FIG. 6 is a view illustrating a lighting control screen displayed through a second smart device in steps S455 and S460 of FIG. 4; and FIG. 7 is a view illustrating a lighting control screen displayed through a first smart device in steps S485 to S495 of FIG. 5.

DETAILED DESCRIPTION

Advantage points and features of the prevent invention and a method of accomplishing thereof will become apparent from the following description with reference to accompanying drawings and embodiments to described in detail with reference to the accompanying drawings. However, the inventive concept may be embodied in various different forms, and should not be construed as being limited only to the illustrated embodiments. Rather, these embodiments are provided as examples so that this disclosure will be thorough and complete, and will fully convey the inventive concept to those skilled in the art. The inventive concept may be defined by scope of the claims.

Unless otherwise defined, all terms (including technical and scientific terms) used in this specification have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terms used in this specification are provided for the illustrative purpose, but the inventive concept is not limited thereto. As used in this specification, the singular terms are intended to include the plural forms as well, unless the context clearly indicates otherwise. Furthermore, it will be further understood that the terms "comprises", "comprising," "includes" and/or "including", when used herein, specify the presence of stated elements, steps, operations, and/or devices, but do not preclude the presence or addition of one or more other components, steps, operations and/or devices.

Hereinafter, embodiments of the inventive concept will be described with reference to accompanying drawings. The same reference numerals will be assigned to the same elements in drawings.

FIG. 1 is a view illustrating the configuration of a wireless lighting control system 1, according to an embodiment.

Referring to FIG. 1, the wireless lighting control system 1 according to an embodiment includes a plurality of lighting devices 100A, 100B, 100C, and 100D, a plurality of smart devices 200A, 200B, 200C, and 200D, a network 300, and a server 400. The lighting devices 100A, 100B, 100C, and 100D include a first lighting device 100A acting as a master and the second lighting devices 100B, 100C, and 100D acting as slaves. The first lighting device 100A is electrically connected with the first smart device 200A, and the second lighting devices 100B, 100C, and 100D are electrically connected with the second smart devices 200B, 200C, and 200D, respectively. Hereinafter, the first lighting device 100A and the second lighting devices 100B, 100C, and 100D are collectively referred to as "lighting device 100", and the first smart device 200A and the second smart devices 200B, 200C, and 200D are collectively referred to as "smart device 200", for the convenience of explanation.

A lighting device 100 may refer to an appliance to reflect, refract, or transmit light emitted from a light source and to fix or protect the light source. The lighting device 100 may have various shapes. For example, the lighting device 100 may have a rod shape enabling a user to hold the lighting device 100. For another example, the lighting device 100 may have a shape enabling the user to wear the lighting device 100 on part of a user body.

According to an embodiment, the lighting device 100 may detect the electrical connection with a smart device 200. If detecting the electrical connection with the smart device 200, the lighting device 100 transceives data and/or a signal with the smart device 200. For example, the lighting device 100 may transmit, to the smart device 200, a determination request signal for determining whether a lighting control application is installed in the smart device 200.

For another example, the lighting device 100 may receive, from the smart device 200, control pattern information according to groups for the lighting devices acting as the slaves. The details of the configuration of the smart device 100 will be described below with reference to FIG. 2.

The smart device 200 may be electrically connected with the lighting device 100. The smart device 200 electrically connected with the lighting device 100 transceives the data and/the signal with the lighting device 100. The smart device 200 receives, from the lighting device 100, the determination request signal for determining whether the lighting control application is installed therein, and transmits, to the lighting device 100, the control pattern information according to groups for the lighting devices acting as the slaves.

The smart device 200 may communicate with the server 400 through the network 300. According to an embodiment, the smart device 200 transmits, to the server 400, at least one of an application request signal for requesting for the lighting control application, a mapping request signal, and a content request signal, and receives, from the server 400, the lighting control application, a mapping completion signal, and requested content.

Meanwhile, if the lighting control application received from the server 400 is completely installed, the smart device 200 forms and displays a lighting control screen. If the lighting control screen is displayed, a user may set groups for the lighting devices acting as the slaves, may set a control pattern for each group, and may input various types of instructions or information related to the lighting control.

The above-described smart device 200 may include a communication device such as a smart phone or a tablet PC. However, the smart device 200 is not limited to the communication device. As long as the communication device has a wireless communication function and a display function, the communication device may be included the smart device 200. The details of the configuration of the smart device 200 will be described below with reference to FIG. 3.

The server 400 communicates with the lighting device 100 and the smart device 200 through the network 300. For example, the server 400 may receive the application request signal from the smart device 200 and then transmit, to the smart device 200, the lighting control application in response to the application request signal. For example, the server 200 may receive the mapping request signal from the smart device 200 and transmit the mapping completion signal to the smart device 200. The mapping request signal is a signal requesting for identification information of the lighting device 100, identification information of the smart device 200, and seat information of a user to each other. For example, the server 400 may receive the content request signal from the smart device 200 and transmit the requested content to the smart device 200. Content may include a text, an image, and a moving picture.

As described above, description has been made with reference to FIG. 1 regarding the configuration of the wireless lighting control system 1 according to an embodiment. With reference to FIG. 1, description has been made while focusing on the case that the lighting control application is distributed to the smart device 200 by the server 400. According to another embodiment, the lighting control application may be distributed to the smart device 200 by the lighting device 100.

FIG. 2 is a block diagram illustrating the configuration of the lighting device 100 illustrated in FIG. 1.

Referring to FIG. 2, the lighting device 100 includes a lighting unit 110, a wired communication unit 120, a control unit 130, and a wireless communication unit 140

The lighting unit 110 includes one or more light sources. For example, the light source may be a light emitting diode (LED). The lighting device 100 may include LEDs in mutually different colors. For example, the lighting device 100 may include at least one of a red LED, a green LED, a blue LED, and a white LED. If lights emitted from the LEDs are mixed, wide color scope may be produced. The mixed color is determined based on the ratio between the intensities of light emitted from each LED, and the intensity of the light emitted from the LED is proportional to a driving current of the LED. In addition, the color of light output from the lighting unit 110 may be controlled by controlling the driving current of each LED. A plurality of LEDs may be arranged in a dot shape. The LEDs are selectively turned on/off, thereby expressing a specific wording or a specific image.

Although the LED has been described as an example of a light source of the lighting device 100, the type of the light source is not limited to the LED. According to another embodiment, an organic light emitting diode (OLED) may be used as a light source.

The wired communication unit 120 may be in charge of wired communication between the lighting device 100 and the smart device 200. Although not illustrated in drawings, the wired communication unit 120 may include a wired communication port (for example, a universal serial bus (USB) port). The wired communication port provided in the wired communication unit 120 of the lighting device 100 may be electrically engaged with a wired communication port provided in a wired communication unit 250 of the smart device 200. After the wired communication port of the lighting device 100 is engaged with the wired communication port of the smart device 200, a signal and/or data may be transceived between the lighting device 100 and the smart device 200. For example, the determination request signal for determining whether the lighting control application is installed is transmitted to the smart device 200 and a response signal to the determination request signal is received from the smart device 200.

The wireless communication unit 140 is in charge of wireless communication between the lighting device 100 and another lighting device. To this end, the wireless communication unit 140 may support a wireless communication scheme. For example, the wireless communication scheme may include ZigBee.

The ZigBee is the standard for Wireless Personal Area Network (WPAN) which is a personal area network wirelessly enabling the access of peripheral devices operating at 868 MHz, 902-928 MHz, and 2.4 GHz. The ZigBee is based on IEEE 802.15 approved by IEEE-SA. When the ZigBee is used, peripheral devices having the distance of 50 m therebetween over the WPAN may transceive data therebetween at the maximum data rate of 250 Kbps.

Although the above description has been made in that the ZigBee is a wireless communication scheme supported by the wireless communication unit 140 for an illustrative purpose, the inventive concept is not limited thereto. The wireless communication unit 140 may further support at least one of wireless communication schemes other than the above communication scheme.

The control unit 130 connects and controls elements of the lighting device 100. For example, the control unit 130 may detect the electrical connection state between the lighting device 100 and the smart device 200. If detecting the connection with the smart device 200, the control unit 130 transmits, to the smart device 200, the determination request signal for determining whether the lighting control application is installed.

In addition, the control unit 130 controls a lighting pattern of the lighting unit 110 based on the control pattern information. The control pattern information may include a light color, a light-on time, a light-off time, and a light blinking rate. As described above, the control pattern information may be previously defined or may be personally set by a user.

As described above, the configuration of the lighting device 100 illustrated in FIG. 1 has been described with reference to FIG. 2. As illustrated in FIG. 2, a power unit may be omitted from the lighting device 100. In this case, the lighting device 100 operates by receiving power from the smart device 200 after electrically connected with the smart device 200. For another example, a power unit (battery) may be further provided in the lighting device 100. The power unit may be separated from the lighting device 100 and replaced with another power unit or may be charged with external power.

FIG. 3 is a block diagram illustrating the configuration of the smart device 200 illustrated in FIG. 1.

Referring to FIG. 3, the smart device 200 includes an input unit 210, a display unit 220, a storage unit 230, a control unit 240, and the wired communication unit 250, and a wireless communication unit 260.

The input unit 210 receives various pieces of information and/or various instructions from a user. For example, the input unit 210 may receive control pattern information for the lighting unit 110 and/or the display unit 220, an operation stand-by instruction, a lighting control execution instruction for starting the lighting control, and a lighting control termination instruction for terminating the lighting control under execution. To this end, the input unit 210 may include at least one of a joystick, a mouse, a keypad, and a keyboard. In this case, the keyboard may be implemented in hardware or in software.

When the lighting control application is executed, the display unit 220 may display the lighting control screen. According to an embodiment, on the lighting control screen, various pieces of information and/or various icons may be arranged. For example, the lighting control screen may have a seat layout of a place, at which a user is positioned, an icon for selecting seat information of the user, a group setting icon for setting a group for the second lighting device and the second smart device, icons corresponding to preset lighting control patterns, an icon for inputting a lighting control execution instruction, and an icon for inputting a lighting control termination instruction. However, icons arranged on the lighting control screen are not limited to the above icons. The lighting control screen may be implemented such that the types and the arrangement positions of icons included in the lighting control screen are set by the user.

The display unit 220 may be controlled based on the control pattern information. The control pattern information may be selected from multiple pieces of preset control pattern information or may be set personally by the user.

The storage unit 230 may include a hard disk drive (HDD), an optical disk drive, a magneto-optical (MO) disk drive, a nonvolatile memory, a volatile memory, or the combination thereof. The storage unit 230 stores data necessary when the smart device 200 operates. For example, the storage unit 230 may store the lighting control application. The lighting control application is to control at least one of the display unit 220 of the smart device 200 and the lighting unit 110 of the lighting device 100.

The lighting control application may be implemented in the form of a mobile application, may be distributed by the server 400 through the network 300, or may be distributed by the lighting device 100.

The wired communication unit 250 may be in charge of wired communication between the lighting device 200 and the smart device 100. Although not illustrated in drawings, the wired communication unit 250 may include a wired communication port. The wired communication port provided in the wired communication unit 250 of the smart device 200 may be electrically connected with the wired communication port provided in the wired communication unit 120 of the lighting device 100. If the wired communication port of the smart device 200 is engaged with the wired communication port of the lighting device 100, a signal and/or data may be transceived between the smart device 200 and the lighting device 100. For example, the determination request signal for determining whether the lighting control application is installed may be received from the lighting device 100 and a response signal to the determination request signal may be received from the lighting device 100.

The wireless communication unit 260 is in the charge of wireless communication between the smart device 200 and the server 400. To this end, the wireless communication unit 260 may support at least one wireless communication scheme. For example, the wireless communication scheme may include Ultra Wide Band (UWB), WiFi, Bluetooth, Bluetooth Low Energy (BLE), ZigBee, Radio frequency (RF), and Infrared Data Association (IrDA), and the inventive concept is not limited thereto.

The control unit 240 connects elements, which are provided in the smart device 200, with each other and controls the elements. For example, if the determination request signal for determining whether the lighting control application is installed is received from the lighting device 100, the control unit 240 may determine whether the smart device 200 has the lighting control application installed therein. If the lighting control application is not installed in the smart device 200 according to the determination result, the control unit 240 may transmit the application request signal to the server 400. Thereafter, if receiving a lighting control application from the server 400, the control unit 240 may install the received lighting control application.

If the lighting control application is executed after completely installed, the control unit 240 may form the lighting control screen. A user may input, through the lighting control screen, information or data necessary for lighting control, may set a group for the lighting control, or may input an instruction for lighting control.

FIGS. 4 and 5 are flowcharts illustrating the operation of the wireless lighting control system 1, according to an embodiment.

Before the description of the operation of the wireless lighting control system, it is assumed that the first lighting device 100A acting as the master and the second lighting devices 100B acting as the slave are positioned within a radio control range by the first lighting device 100A.

First, the first lighting device 100A detects the electrical connection with the first smart device 200A (S400). Thereafter, the first lighting device 100A transmits, to the first smart device 200A, a determination request signal for determining whether a lighting control application is installed in the first smart device 200A (S405).

The first smart device 200A determines whether to have the lighting control application installed therein. If the lighting control application is not installed or the update of the lighting control application is necessary according to the determination result, the first smart device 200A transmits, to the server 400, an application request signal for requesting for the lighting control application or an update request signal for requesting for the update of the lighting control application.

The server 400 transmits the lighting control application, which is requested, to the first smart device 200A through the network 300 (S415).

If the lighting control application is executed after installed in the first smart device 200A, a lighting control screen is formed. The lighting control screen is displayed through the display unit 220 of the first smart device 200A.

Thereafter, if a user inputs an operation stand-by instruction through the lighting control screen, the input operation stand-by instruction is transmitted to the first lighting device 100A through the wired communication unit 250 of the first smart device 200A (S420).

The first lighting device 100A transmits the operation stand-by instruction, which is received from the first smart device 200A, to the second lighting device 100B through a wireless communication scheme (S425).

The second lighting device 100B controls a lighting unit 110 thereof based on the operation stand-by instruction received from the first lighting device 100A to notify a user of the reception of the operation stand-by instruction (S430). For example, the second lighting device 100B may blink the lighting unit 110 at regular intervals for a specific time, thereby notifying the user having the second lighting device 100B of the reception of the operation stand-by instruction.

The user having received the operation stand-by instruction couples the second lighting device 100B to the second smart device 200B. Accordingly, the second lighting device 100B detects the electrical connection with the second smart device 200B (S435).

If detecting the electrical connection with the second smart device 200B as described above, the second lighting device 100B transmits, to the second smart device 200B, a determination request signal for determining whether a lighting control application is installed.

Thereafter, the second smart device 200B determines whether the lighting control application is installed therein. If the lighting control application is not installed or the update of the lighting control application is necessary according to the determination result, the second smart device 200B transmits, to the server 400, an application request signal for requesting for the lighting control application or an update request signal for requesting for the update of the lighting control application (S445).

The server 400 transmits the lighting control application, which has been requested, to the second smart device 200B through the network 300 (S450).

If the lighting control application is executed after installed in the second smart device 200B, a lighting control screen is formed. If the user inputs information on a place, at which the user is positioned, through the lighting control screen, the seat layout of the place is searched for and displayed as illustrated in FIG. 6 (S455). For example, the seat layout of an athletic field or a concert hall, in which the user is positioned, may be searched and displayed. In this case, the seat layout may be searched in the storage unit 230 of the second smart device 200B. For another example, the seat layout may be searched for in the server 400 and may be provided to the second smart device 200B.

A user of the second smart device 200B selects his or her seat from the lighting control screen of FIG. 6, thereby personally inputting his or her seat information (S460).

Meanwhile, the seat information may be automatically input. For example, a ticket of the user of the second smart device 200B may be printed with a bar code (a two dimensional (2D) bar code or a three dimensional (3D) bar code) including the seat information. If the user scans the bar code of the ticket by using the second smart device 200B, the second smart device 200B may recognize the bar code and may acquire the seat information. To this end, the second smart device 200B may further include a capturing unit (not illustrated) to acquire an image by scanning the bar code. In addition, the second smart device 200B may further include a bar code recognition program for recognizing seat information from the image acquired by the capturing unit. In this case, the bar code recognition program may be implemented to be included in the lighting control application.

For another example, a near-field communication (NFC) tag may be attached to each seat to record seat information of the seat. When a user sits on his or her seat and makes the second smart device 200B close to the NFC tag, the second smart device 200B may acquire the seat information from the NFC tag. As described above, when the second smart device 200B automatically acquires the seat information, operation S455 of displaying the seat layout may be omitted.

Thereafter, if the user selects an icon 22 of 'seat selection completed' from the lighting control screen of FIG. 6, the control unit 240 of the second smart device 200B transmits a mapping request signal to the server 400 (S470). The mapping request signal may include identification information (for example, a serial number) of the second lighting device 100B, identification information of the second smart device 200B, and seat information.

The server 400 maps information included in a mapping request signal to each seat of the seat layout (S475). If identification information is mapped to all seats of the seat layout, the server 400 transmits a mapping completion signal to the first smart device 200A acting as the master (S480).

Thereafter, a lighting control screen including the seat layout is displayed on the display unit 220 of the first smart device 200A (S485). The user of the first smart device 200A may set a group for lighting control while referring to the seat layout (S490). For example, as illustrated in FIG. 7, the user may drag a specific area of the seat layout and draws a boundary 24 of the specific area, thereby setting the group for the lighting control.

After setting the group, the user may set control pattern information for each group (S495). The control pattern information may include at least one of control pattern information for the lighting unit 110 and control pattern information for the display unit 220. For example, the control pattern information for the lighting unit 110 may include a light color, a light brightness, a light-on time, a light-off time, and a light blinking rate. For example, the control pattern information for the display unit 220 may include a screen color, a screen brightness, a screen display start time, a time interval for screen blinking, a screen display termination time, and identification information of content to be displayed on the screen. A user may select each group and may set control pattern information. In detail, if the user selects an inner part of a predetermined group from the boundary 24, the display unit 220 displays menus for setting control pattern information for the group. In this case, the user may set the control pattern information for the group by using the displayed menus.

If the user selects an icon 23 of 'setting completed' after setting the control pattern information for each group, the first smart device 200A transmits the control pattern information for each group to the first lighting device 100A (S500).

The first lighting device 100A transmits the control pattern information for each group to the second lighting device 100B through the wireless communication scheme (S505).

The second lighting device 100B transmits the control pattern information for each group, which is received from the first lighting device 100A, to the second smart device 200B. After checking the control pattern information for each group, the second smart device 200B determines whether the communication with the server 400 is necessary (S515). For example, if content identification information is included in the control pattern information for the display unit 220 as the determination result of the control pattern information for the display unit 220 in the control pattern information for each group, the second smart device 200B may transmit a content request signal for requesting for relevant content to the server 400 (S520).

The server 400 searches for the content requested by the second smart device 200 and transmits the content to the second smart device 200B (S525). Thereafter, the server 400 transmits, to the first smart device 200A, a transmission completion signal for notifying that the transmission of the content is completed (S530).

Thereafter, if a lighting control execution instruction is input from the user, the first smart device 200A transmits the input lighting control execution instruction to the first lighting device 100A (S535).

The first lighting device 100A transmits the lighting control execution instruction to the second lighting device 100B (S540).

The second lighting device 100B transmits the lighting control execution instruction, which has been received from the first lighting device 100A, to the second smart device 200B (S545).

Thereafter, the lighting unit 110 of the second lighting device 100B and the display unit 220 of the second smart device 200B are controlled based on the control pattern information for each group, which has been received in previous operations S505 and S510, (S550 and S555).

As described above, the operation of the wireless lighting control system 1 and the lighting control screen according to an embodiment have been described with reference to FIGS. 4 to 7. Some of operations illustrated in FIGS. 4 and 5 may be omitted. For example, if a plurality of second lighting devices are provided for relevant seats in order of identification information (for example, a serial number), operation S455 of displaying the seat layout on the second smart device 200B and operation S460 of inputting seat information of the user by the user may be omitted.

According to the above method, the lighting units 110 of the second lighting devices 100B, 100C, and 100D and the display units 220 of the second smart devices 200B, 200C, and 200D are simultaneously controlled. As compared to the case of controlling only the lighting units 110 of the second lighting devices 100B, 100C, and 100D, the visual cheering effect may be increased. In addition, since various contents, such as a text, an image, and a moving picture, may be integrally displayed through the second smart devices 200B, 200C, and 200D, visual cheering effects may be produced in various manners.

As described above, description has been made regarding embodiments of the inventive concept. Embodiments of the inventive concept may be realized with a medium, such as a computer-readable medium, including a computer-readable code/command for controlling at least one processing element of the above-described embodiments. The medium may correspond to a medium/media enabling the storage and/or the transfer of the computer-readable code.

The computer-readable code may be not only recorded in a medium, but also transferred through the Internet. The medium may include, for example, a recording medium, such as a magnetic storage medium (for example, a read only memory (ROM), a floppy disk, a hard disk, or the like) and an optical recording medium (for example, a CD-ROM, a Blu-Ray, a DVD, or the like) and a transfer medium such as a carrier wave. Since the media may be provided in the form of a distributed network, the computer-readable code may be stored/transferred and executed in a distributed manner. Further, as one example, processing elements may include a processor or a computer processor and may be distributed and/or included in one device.

Although embodiments of the inventive concept have been described with reference to accompanying drawings, those skilled in the art should understand that various modifications are possible without departing from the technical scope of the inventive concept or without changing the technical sprite or the subject matter of the inventive concept. Therefore, those skilled in the art should understand that the technical embodiments are provided for the illustrative purpose in all aspects and the inventive concept is not limited thereto.

What is claimed is:

1. A wireless lighting control system comprising:
    a master device; and
    a plurality of slave lighting devices used for an event of a meeting, included in different groups, and controlled differently under control of the master device,
    wherein the master device is configured to transmit, to the plurality of slave lighting devices, control information for each group that is capable of controlling the plurality of slave lighting devices for each group,
    wherein the control information for the each group includes control information that allows the plurality of slave lighting devices to be displayed in different lighting colors to express visual effect related to an event of a corresponding meeting,
    wherein the plurality of slave lighting devices are further configured to:
    receive the control information for the each group during the event of the corresponding meeting,
    display the different lighting colors for the each group based on the control information for the each group in response to a progress of the event of the corresponding meeting, and
    map with seat information received from each of a plurality of smart devices of users in the corresponding meeting when each of the plurality of smart devices is connected, wherein the plurality of smart devices further include a capture unit configured to scan a barcode of an admission ticket to obtain an image, and a barcode recognition program configured to determine corresponding seat information from the image obtained by the capture unit.

2. The wireless lighting control system of claim 1, wherein the barcode recognition program is included in a lighting control application installed in the plurality of smart devices, and
    wherein the plurality of slave lighting devices are mapped with the seat information via the lighting control application.

3. The wireless lighting control system of claim 1, wherein the control information for the each group further includes control information that allows the plurality of slave lighting devices to have at least one of different lighting brightness, lighting on time, lighting off time, and lighting blinking speed for the each group.

4. The wireless lighting control system of claim 1, wherein the plurality of slave lighting devices are mapped to a seat layout based on the seat information, and
    wherein the master device manages group information of the plurality of slave lighting devices set based on locations to which the plurality of slave lighting devices are mapped.

5. The wireless lighting control system of claim 1, wherein the master device is further configured to:
    display a lighting control screen capable of controlling the plurality of slave lighting devices for each group,
    receive an input to select the at least one group,
    display at least one menu for setting control information about the selected group, and
    set the control information about the selected group based on an input to the displayed menu.

6. The wireless lighting control system of claim 1, wherein the master device is further configured to:
    display a lighting control screen including a seat layout capable of controlling the plurality of slave lighting devices for the each group, wherein the seat layout includes at least one of the different groups, and
    set control information about at least one group included in the seat layout.

7. The wireless lighting control system of claim 6, wherein the master device is further configured to:
    receive an input to select the at least one group included in the seat layout,
    display at least one menu for setting control information for the selected group, and
    set the control information about the selected group based on an input to the displayed menu.

8. The wireless lighting control system of claim 7, wherein the master device is further configured to:
    receive a selection input to select an inside of a boundary of the at least one group included in the seating map, and
    set the control information about the selected group.

* * * * *